3,525,755
PROCESS OF PREPARING POLYCARBOXYLIC ACID ESTERS OF TERTIARY 17-STEROID ALCOHOLS
Paul-Eberhard Schulze, Berlin, Germany, assignor to Schering A.G., Berlin, Germany
No Drawing. Filed Nov. 15, 1965, Ser. No. 514,724
Claims priority, application Germany, Nov. 25, 1964, Sch 36,156
Int. Cl. C07c *169/32*
U.S. Cl. 260—397.4                                     15 Claims

ABSTRACT OF THE DISCLOSURE

Polycarboxylic esters of tertiary 17-steroid alcohols are prepared by mixing and reacting a polycarboxylic acid with trifluoroacetic acid anhydride in a suitable solvent with a steroid compound, preferably under nitrogen.

---

The invention relates to a method of preparing esters, not heretofore described of tertiary steroid alcohols with polycarboxylic acids. More particularly, it relates to a method of esterifying tertiary hydroxyl groups in steroid alcohols.

The acids that may be employed in the method of the invention may have straight or branched carbon chains, and they may be saturated or unsaturated, and the carboxylic radicals not participating in the esterification reaction may be functionally modified, for example, esterified. It has been found that the following acids can be used, and are being mentioned by way of example only, namely: adipic acid, sebacic acid, suberic acid, cumaric acid, the monoesters of succinic acid and diglycolic acid, etc. Polycarboxylic acids to be employed in the method of the invention may be substituted; for example, by halogen atoms, by hydroxyl, amino, keto groups and similar radicals. Straight-chained dicarboxylic acids having more than five carbon atoms in their molecule are preferred and are particularly suitable.

The problem of preparing such tertiary esters, and particularly the half-esters or acid esters of steroid alcohols is still a problem awaiting solution since the method disclosed in the Canadian Pat. No. 640,833 does not lead to the claimed results.

According to the description in Canadian Pat. No. 640,833, the 17α-hydroxyprogesteron hemisuccinate is prepared by prolonged heating of the steroid alcohol with a mixture of succinic acid and succinic anhydride in benzene, the anhydride employed being the inner anhydride, not an anhydride derived from two molecules of the acid such as is employed conventionally in the esterification reactions of monocarboxylic acids.

It is apparent from our own experiments that the desired esterification reaction is prevented by the formation of the inner anhydride in the case of succinic acid as well as that of glutaric acid. It must therefore be concluded that the alleged 17α-hydroxyprogesteron hemisuccinate is not formed by the method of the Canadian Pat. No. 640,833, an assumption which is also supported by the lack of all data on physical properties of the product in the patent.

The known esterification methods are also not applicable to polycarboxylic acids having relatively long carbon chains because such polycarboxylic acids are well known not to be capable of forming inner anhydrides nor anhydrides derived from two molecules of the same acid.

Substances which are not stable under the severe reaction conditions of the aforementioned esterification method are a priori unsuited, such as hydrocortisone and similar substances having sensitive side chains.

According to the instant invention, esters of tertiary steroid alcohols with polycarboxylic acids are formed by reacting the steroid compounds with a mixture of trifluoracetic anhydride and the desired polycarboxylic acid. Aside from the tertiary hydroxyl radical, the steroid compounds may contain additional hydroxyl groups, double bonds, saturated or unsaturated mono- and divalent aliphatic radicals, alkoxy and keto groups.

All carboxyl groups of the polycarboxylic acid except one may be functionally modified, for example, esterified. If the polycarboxylic acid which is to be used for the esterification is capable of forming an inner anhydride, the carboxyl radicals which do not participate in the esterification reaction are first protected, for example, by esterification with alcohols which may be removed readily after the principal reaction.

The esterification process of the invention is preferably carried out in the presence of a solvent inert to the reactants at a temperature of 10°–50° C., and most conveniently at room temperature. Solvents miscible with water, such as tetrahydrofuran or dioxane, or solvents not miscible with water, such as benzene, may be employed.

The esterification takes place under very mild chemical conditions. The polycarboxylic acid may be mixed, for example, with trifluoroacetic anhydride in a suitable solvent while cooling with ice. A mixed anhydride is thereby formed. The formation of the mixed anhydride is capable of visual observation in some cases because the polycarboxylic acids are insoluble, for example, in benzene, whereas the anhydride formed is soluble. The formation of the mixed anhydride is usually completed after a short time, and an equilibrium is established which depends on the selected mixing ratio. The steroid to be esterified is then added, and the reaction mixture is left to stand. The esterification, which is completed in most cases in less than three hours, is preferably carried out in the absence of atmospheric oxygen. Nitrogen is a suitable and preferred protective gas.

The reaction mixture is worked up according to known methods. If, for example, polycarboxylic acids having additional free carboxyl groups are reacted, the reaction mixture may be extracted by shaking with aqueous sodium carbonate solution, whereupon the aqueous extract is acidified. If the steroid compound is esterified by reaction with acid esters, chromatography may be employed for separating the ester formed from unreacted starting materials.

The esters prepared according to the method of the invention are useful intermediates in the synthesis of medicinal compounds. Some of the new compounds have a strong biological activity of their own. They show particularly corpus luteum hormone effects.

The solubility of suitable salts, such as the sodium, potassium and similar salts of the steroids esterified with polycarboxylic acids in water is of particular interest to biologists.

Solubility in water can be generally achieved by conversion, for example, to the sodium salt.

As will be apparent from the following table of comparison data on the sodium 19-nor-17α-hydroxyprogesterone-17-hemisuberate (II) and sodium 17α-ethinyl-19-nor-testerone - 17 - hemiadipate (III) with the known standard compound sodium 19-nor-17α-hydroxyprogesterone-17-hemisulfate (I), the compounds of the invention have significantly higher oxytocin antagonism. The effect was determined by in vitro tests according to F. Neumann and R. Hempel, "Acta Endocrinologica" 48 (1965) 645–663, with the inhibiting action of the comparison compound I being set at 1.

TABLE

| Compound: | Inhibiting effect |
|---|---|
| (I) Sodium 19-nor-17α-hydroxyprogesterone-17-hemisulfate | 1 |
| (II) Sodium 19-nor-17α-hydroxyprogesterone-17-hemisuberate | 3 |
| (III) Sodium 17α-ethinyl-19-nor-testosterone-17-hemiadipate | 10 |

The oxytocin inhibiting effect shown in the table can be confirmed in vivo in the rabbit: 2 of 3 tested experimental animals showed full effectiveness of intravenously applied doses of Compound III of 30 mg./kg.

The gestagenous effect of the esters of the invention was determined by the well known Clauberg test in which, for example, methyl 17α-ethinyl-19-nor-testosterone-hemiadipate was shown to be about 5 times stronger than progesterone which is a known commercial product.

The following illustrative examples are given to show the scope of the invention without any restriction thereto.

EXAMPLE 1

885 mg. of adipic acid are suspended in 5 ml. of benzene. 2 ml. of benzene are distilled off from the mix in order to remove water. The solution is subsequently cooled to about +5° C., and 1.27 g. of trifluoroacetic anhydride are added. The completed mixture is then stirred for about 20 minutes at room temperature, whereby a clear solution is formed. After 20 additional minutes, 500 mg. of 17α-hydroxyprogesterone are added which are dissolved, whereby the solution becomes slightly yellow. Stirring is continued at room temperature for about 3 hours. The reaction mixture is then admixed with stirring and drop by drop to 50 ml. of ice water. The resulting mixture is neutralized with sodium hydroxide, extracted with ether, and the aqueous phase is adjusted with hydrochloric acid to pH 2. An oily precipitate is thereby formed at first, and is transformed to a crystalline compound after some stirring. The latter is filtered off with suction, washed until neutral, and dried. Yield: 350 mg. of 17α-hydroxyprogesterone-17α-hemiadipate, melting point: 196–199° C. After recrystallization from acetone, there are obtained 137 mg. of the pure substance, M.P. 202–203.5° C.

EXAMPLE 2

9.25 g. of adipic acid are suspended in 50 ml. of benzene, and the benzene is partially distilled off to remove water. 9.5 ml. of trifluoroacetic anhydride are added after cooling to about +5° C. Stirring is continued for 20 minutes at room temperature. Now 5 g. of 19-nor-17α-hydroxyprogesterone are added with renewed ice cooling. Stirring is continued for 2½ hours at room temperature, and the reaction mixture is thereafter stirred into 100 ml. of ice water. The pH is adjusted to 8 with sodium hydroxide, the liquid is extracted with ether; the ether phase is extracted with sodium carbonate solution. The sodium carbonate extract is combined with the original aqueous phase, and the mixture is acidified with hydrochloric acid. The precipitate formed contains both the hemiadipate and free adipic acid. The entire precipitate is filtered with suction and is washed with copious water for removal of the adipic acid. The resultant yield is 5 g. of 19-nor-17α-hydroxyprogesterone-17-hemiadipate, 71% of theoretical amount, having a M.P. 150–155° C. After recrystallization from acetone, there remain 3.2 grams with a melting point of 167.5–168° C.

EXAMPLE 3

4.04 g. of adipic acid are suspended in 25 ml. of benzene, and the benzene is partly distilled off to remove water. 4.13 ml. of trifluoroacetic anhydride are added with ice cooling, whereby a clear solution is formed within 20 minutes. Stirring is continued for 20 minutes more, and 2.5 g. of hydrocortisone are added thereafter. After a reaction period of two hours at room temperature, the entire reaction mixture is stirred into an amount of 2 N sodium hydroxide sufficient to establish a pH of 8 in the mixture. The ice cooled, alkaline aqueous phase is extracted with ether, and the aqueous phase is then carefully acidified with hydrochloric acid. There is formed at first an oil precipitate. The substance solidifies after prolonged stirring. It is filtered with suction, and is washed with much water to remove the excess of adipic acid. Yield: 1.5 g. of raw product. After recrystallization from methanol, there are obtained 500 mg. hydrocortisone-17-hemiadipate. Melting point 201–203.5° C.

EXAMPLE 4

5 g. of 19-nor-17α-hydroxyprogesterone are treated with 10.55 g. of suberic acid and 9.07 ml. trifluoroacetic anhydride as described in the preceding example and the reaction mixture is worked up in an analogous manner. After recrystallization from acetone, there are obtained 2.24 g. of pure 19-nor-17α-hydroxyprogesterone-17-hemisuberate, of melting point 142–143.5° C.

EXAMPLE 5

3.99 of monomethyl succinate are dissolved in 25 ml. benzene, and the benzene is partly distilled off in order to remove water therefrom. 4.5 ml. of trifluoroacetic anhydride are added with ice, cooling, and the mixture is stirred for 20 minutes more. The monomethyl succinate precipitated by ice cooling now redissolves. Thereafter 2.5 g. of 17α-hydroxy-progesterone are added, also cooling with ice, and the reaction mixture is stirred at room temperature for 2½ hours. It is evaporated in a vacuum in the presence of a protective gas such as $N_2$ to half its initial volume, ether is then added, and the ether phase is washed exhaustively with water and sodium carbonate solution, then dried, and evaporated. Yield: 4.13 g. of methyl 17α-hydroxyprogesterone-17-hemisuccinate.

The substance is dissolved in isopropyl ether, the sparingly soluble fraction, i.e., the unreacted starting material is filtered off, and the ether solution is chromatographed over silica gel. The pure fractions are combined and again recrystallized from methanol. Yield: 860 mg., melting point 108–109° C.

EXAMPLE 6

The method herein is as described in Example 5 using 5 g. of 19-nor-17α-hydroxyprogesterone which are reacted with 10 g. monomethyl adipate and 7.05 ml. trifluoroacetic anhydride. After chromatography and recrystallization from methanol, there are obtained 1.2 g. of pure methyl 19-nor-17α-hydroxyprogesterone-17-hemi-adipate. Melting point 102–104° C.

EXAMPLE 7

The method herein is as described in Example 1 using 1 g. of 17α-ethinyl-19-nor-testosterone which is treated with 884 mg. of adipic acid and 1.27 g. trifluoroacetic anhydride. The mixture is worked up in the same way as in Example 1. After recrystallization from acetone, there are obtained 650 mg. of pure 17α-ethinyl-19-nor-testosterone-17-hemiadipate.

From the foregoing examples, it will be noted that esters of steroids are prepared by the reaction of tertiary steroid alcohols with polycarboxylic acids and an anhydride.

17α-hydroxyprogesterone-17-hemiadipate (prepared as described in Example 1) suspended in a small amount of water is dissolved by adding 1 N aq. sodium hydroxide without exceeding pH 7.7. By this process the solubility is higher than 25 g. pro. 100 ml. solution.

For preparing sodium salt the aq. solution is dried by freezing. The sodium salt is a colorless powder.

Potassium salt, the earth alkali salts or the salts of organic bases, e.g. the methylglucame salt can be prepared in analogous manner.

The ester derivatives prepared according to Example 5 are not convertible into water soluble salts. However, their solubility in organic solvents is variable by modification of the ester group. Instead of methanol, as described in Example 5, the second carboxylic group may be esterificated by ethanol, propanol or other suitable alcohols.

I claim:

1. A method for preparing dicarboxylic acid esters of tertiary 17-steroid alcohols which comprises reacting a dicarboxylic acid with tertiary steroid 17-alcohols, in the presence of trifluoroacetic anhydride and a solvent; the carboxyl groups of said dicarboxylic acid being capable of forming inner anhydrides and not participating in the reaction being previously protected; working up the reaction mixture, converting the product so obtained to the corresponding salts with physiologically tolerated bases.

2. The method as set forth in claim 1, wherein esterification is carried out at 10–50° C., and preferably at room temperature.

3. The method as set forth in claim 1 in which the esters of tertiary steroid 17 alcohols are selected from the group of compounds consisting of radicals

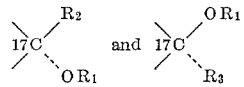

in position 17, wherein $R_1$ is the radical of a dicarboxylic acid, $R_2$ is the acetyl or the hydroxyacetyl group; and $R_3$ is a hydrocarbon radical up to two carbon atoms and their salts with physiologically tolerated bases.

4. The method as set forth in claim 3 for the production of 17α-hydroxyprogesterone-17-hemi-adipate.

5. The method as set forth in claim 3 for the production of sodium 17α-hydroxyprogesterone-17-hemi-adipate.

6. The method as set forth in claim 3 for the production of 19-nor-17α-hydroxyprogesterone-17-hemi-adipate.

7. The method as set forth in claim 3 for the production of sodium 19-nor-17α-hydroxyprogesterone-17-hemi-adipate.

8. The method as set forth in claim 3 for the production of hydrocortisone-17-hemi-adipate.

9. The method as set forth in claim 3 for the production of sodium hydrocortisone-17-hemi-adipate.

10. The method as set forth in claim 3 for the production of 19-nor-17α-hydroxyprogesterone-17-hemi-suberate.

11. The method as set forth in claim 3 for the production of sodium 19-nor-17α-hydroxyprogesterone-17-hemi-suberate.

12. The method as set forth in claim 3 for the production of methyl 17α-hydroxyprogesterone-17-hemi-succinate.

13. The method as set forth in claim 3 for the production of methyl 19-nor-17α-hydroxyprogesterone-17-hemi-adipate.

14. The method as set forth in claim 3 for the production of 17α-ethinyl-19-nor-testosterone-17-hemi-adipate.

15. The method as set forth in claim 3 for the production of sodium 17α-ethinyl-19-nor-testosterone-17-hemi-adipate.

References Cited

UNITED STATES PATENTS

| | | | |
|---|---|---|---|
| 2,959,601 | 11/1960 | Allais et al. | 260—397.4 |
| 3,033,749 | 5/1962 | Wettstein et al. | 167—65 |
| 3,064,014 | 11/1962 | de Jongh et al. | 260—397.5 |
| 3,087,938 | 4/1963 | Reimann et al. | 260—397.3 |
| 3,147,290 | 9/1964 | Spero | 260—397.47 |
| 3,253,003 | 5/1966 | Wettstein et al. | 260—397.4 |

OTHER REFERENCES

Stacey et al.: Nature, 164, p. 705 (1949).
Morgan: J.A.C.S. 73 p. 860 (1951).

HENRY A. FRENCH, Primary Examiner

U.S. Cl. X.R.
260—397.45, 999